Patented Jan. 1, 1946

2,392,162

UNITED STATES PATENT OFFICE 2,392,162

MOLDING POWDER AND PROCESS OF MAKING THE SAME

Harry F. Lewis, Appleton, Wis., assignor, by mesne assignments, to The Pacific Lumber Company, San Francisco, Calif., a corporation of Maine No Drawing. Application July 12, 1940, Serial No. 345,106

11 Claims. (Cl. 106—200)

The present invention relates to molding powders and the method of making the same, and more particularly to redwood molding powders.

The principal object of the present invention is to provide improved molding powder.

Another object of the present invention is to provide methods of making improved molding powder.

A more specific object of the present invention is to provide improved redwood molding powders containing redwood resinous compositions including redwood tannin and phlobaphenes modified by the process herein described.

Other objects of the present invention will be apparent as the description hereinafter proceeds.

Heretofore, it has been proposed to form molding compositions by a steam pressure treatment of hardwoods and woods such as the yellow pine. According to the prior treatments the woods are subjected to relatively high temperatures or pressures for relatively long periods of time and the treated material thus obtained subjected to a special washing step in order to remove "water-soluble," the presence of which were found undesirable for molding purposes. Losses up to 40 per cent based on the weight of the dry wood were frequently encountered in obtaining the final products by the prior treatments.

The products obtained by the above mentioned prior processes (although satisfactory for producing certain types of molded articles) were also found to be of limited utility. They were found, for example, not to be satisfactory for conversion into molding powders or compositions for subsequent use in complicated molds where a considerable amount of flow is required.

After prolonged research investigation I discovered a method of treating California redwood (i. e. the softwood or conifer known as Sequoia sempervirens) resulting in the preparation of improved molding powders having a very satisfactory flow and other molding characteristics. The new method at the same time employs relatively low temperatures and pressures coupled with shorter periods of treatment than has been the case in prior treatments of a similar type. In addition, according to the present invention, losses are substantially reduced for in the new method the black cooking liquor containing the "water-solubles" is used and the compositions therein are an essential part of the molding powder. The retention of water-soluble compositions (ordinarily wasted to the sewer in the prior methods of treatment) has been found necessary for the formation of a satisfactory product prepared in accordance with the present invention.

Investigations show that redwood behaves differently than pine wood when subjected to the process of the present invention and that these differences in action which result in different type products are due primarily to the presence of special type tannins and phlobaphenes found in redwood. These tannins and phlobaphenes are modified, i. e. undergo a chemical change, during the steam treatment hereinafter described, and in their modified form are essential constituents of the products of the present invention.

In accordance with the present invention I prefer to treat redwood chips, sawdust or the like (preferably obtained from stump or root wood) in accordance with the general process of Mason Patent No. 1,824,221, September 22, 1931; employing the digester or gun for disintegration of the fibrous material therein described. The heat treatment carried out in the steam digester should preferably be at about 600 pounds per square inch pressure for a period of about 10 to 12 seconds.

After the completion of the heat treatment the material is discharged from the digester, the change from high pressure to low pressure (e. g. atmospheric) resulting in an explosive disintegration of the wood material. The solid material together with the cooking liquor is then dried, e. g. air drying. The dry material obtained may be ground to molding powder or, if desired, may be left in its fibrous condition.

While the steam pressure and period of treatment may be varied somewhat the use of relatively high pressures (e. g. 900 to 1000 pounds per square inch) and/or the use of relatively long periods of treatment (e. g. 50 seconds to 30 minutes) results in the formation of inferior molding powder. High pressures, for example, give a final product with a fair flow and finish but poor impact strength. Low pressures on the other hand (e. g. 300 to 400 pounds per square inch) give a final product with an insufficient flow and poor finish. For purposes of the present invention pressures of 500 to 800 pounds per square inch and periods of treatment of 8 to 15 seconds (the higher pressures requiring shorter periods of treatment and vice versa) may be employed. The product, however, having the best molding properties including flow, finish, strength, etc., is obtained by bringing the digester up to 600 pounds pressure (which requires about 30 seconds) and holding the pressure at 600 pounds for 10–12 seconds.

The product obtained by the present process is a thermosetting composition and is excellently suited for molding compositions. In addition to the woody material it contains as essential constituents redwood tannins and phlobaphenes which have been modified into unique compositions of unknown structure by the heat and pressure treatment.

The products of the present invention have been found adaptable for use with other resinous or potentially resinous compositions. The following preferred example will serve for illustrative purposes.

About 3–10% (preferably 5%) of extracted pine wood pitch is added to a batch of the air dried redwood product described above. The mixture is mixed to form a homogeneous product preferably in a Banbury type mixer and is then ready for molding directly. This particular molding powder is especially suited for use in intricate molds such as spool molds in which the molded products are used to wind wire, etc. The extracted pine wood pitch employed in this example is described in detail in U. S. Patent No. 2,115,496 of April 26, 1938. Specifically it is a pine wood pitch, characterized by substantial insolubility in petroleum hydrocarbons and comprising a residue low in abietic acid remaining after the separation of refined rosin high in abietic acid from the resinous material obtained by extraction of pine wood.

It will be understood that the present invention is not limited to the above illustrative examples. All modifications falling within the scope of the present invention are intended to be covered by the claims annexed hereto.

I claim:

1. A process of making a molding ingredient which comprises subjecting redwood to a heat treatment in the presence of steam at a pressure of 500 to 800 pounds per square inch for a period of 8 to 15 seconds, disintegrating the redwood, drying the disintegrated redwood with the cooking liquor formed by the steam treatment, and mixing the resulting dried mass to form a substantially homogeneous product.

2. A process of making a molding ingredient which comprises subjecting redwood to a heat treatment in the presence of steam at a pressure of 600 pounds per square inch for a period of 10 to 12 seconds, disintegrating the redwood, drying the disintegrated redwood with the cooking liquor formed by the steam treatment, and mixing the resulting dried mass to form a substantially homogeneous product.

3. A process of making a thermosetting molding ingredient containing as essential constituents heat and pressure modified redwood tannin and phlobaphenes, which comprises subjecting redwood chips, sawdust or the like containing a substantial portion of redwood stump or root wood to a heat treatment in the presence of steam at a pressure of about 600 pounds per square inch for a period of about 10 to 12 seconds, disintegrating the redwood, air drying the disintegrated redwood with the cooking liquor resulting from the steam treatment, and subjecting the resulting dried mass to a mixing treatment to form a substantially homogeneous product.

4. A molding ingredient, disintegrated redwood and redwood cooking liquor prepared by subjecting redwood to a heat treatment in the presence of steam at a pressure of 500 to 800 pounds per square inch for a period of 8 to 15 seconds.

5. A molding ingredient, disintegrated redwood and redwood cooking liquor prepared by subjecting redwood to a heat treatment in the presence of steam at a pressure of 600 pounds per square inch for a period of 10 to 12 seconds.

6. A thermosetting molding ingredient containing as essential constituents heat and pressure modified redwood tannin and phlobaphenes and consisting of a mixture of disintegrated redwood and redwood cooking liquor prepared in accordance with the process of claim 3.

7. A process of making a molding powder which comprises subjecting redwood to a heat treatment in the presence of steam at a pressure of about 500 to 800 pounds per square inch for a period of about 8 to 15 seconds, disintegrating the redwood, drying the disintegrated redwood with the cooking liquor formed by the steam treatment, adding about 3 to 10 per cent extracted pine wood pitch to the resulting dried mass and then subjecting the mixture thus formed to a mixing operation to form a substantially homogeneous product.

8. A process of making a molding powder which comprises subjecting redwood to a heat treatment in the presence of steam at a pressure of about 600 pounds per square inch for a period of about 10 to 12 seconds, disintegrating the redwood, drying the disintegrated redwood with the cooking liquor formed by the steam treatment, adding about 5 per cent extracted pine wood pitch to the resulting dried mass and then subjecting the mixture thus formed to a mixing operation to form a substantially homogeneous product.

9. A molding powder containing about 3 to 10 per cent extracted pin wood pitch and the remainder disintegrated redwood and redwood cooking liquor prepared by subjecting redwood to a heat treatment in the presence of steam at a pressure of 500 to 800 pounds per square inch for a period of 8 to 15 seconds.

10. A molding powder containing about 5 per cent extracted pine wood pitch and the remainder a thermosetting molding ingredient containing as essential constituents heat and pressure modified redwood tannin and phlobaphenes and consisting of a mixture of disintegrated redwood and redwood cooking liquor prepared in accordance with the process of claim 3.

11. A process for making a molded powder from redwood substantially without other ingredients, such redwood containing significant percentages of tanning and phlobaphenes which comprises: subjecting the comminuted redwood to explosive disintegration with high-pressure steam; and reducing the entire product of such disintegration to dryness, whereby all non-volatile ingredients of the original mass are retained to form a material suitable for making plastic molded products without the addition of other substances.

HARRY F. LEWIS.